United States Patent
Streck et al.

[11] 3,816,382
[45] June 11, 1974

[54] POLYALKENAMERS AND PROCESS FOR THE PREPARATION THEREOF

[75] Inventors: Roland Streck; Heinrich Weber, both of Marl, Germany

[73] Assignee: Chemische Werke Huels AG, Marl, Germany

[22] Filed: Sept. 8, 1970

[21] Appl. No.: 70,497

[30] Foreign Application Priority Data
Sept. 8, 1969  Germany.......................... 1945358

[52] U.S. Cl. ...... 260/93.1, 260/33.6 PQ, 260/82.1, 260/88.2 B, 260/88.2 D, 260/88.2 F
[51] Int. Cl. ............................................. C08f 1/80
[58] Field of Search ........ 260/93.1, 88.2 R, 88.2 B, 260/88.2 D, 88.2 F

[56] References Cited
UNITED STATES PATENTS

| | | | |
|---|---|---|---|
| 3,029,231 | 4/1962 | Amerongen ...................... | 260/87.5 |
| 3,074,918 | 1/1963 | Eleuterio........................ | 260/93.1 |
| 3,458,489 | 7/1969 | Natta et al....................... | 260/93.1 |
| 3,459,725 | 8/1969 | Natta et al....................... | 260/93.1 |
| 3,476,728 | 11/1969 | Natta et al....................... | 260/93.1 |
| 3,492,278 | 1/1970 | Uraneck et al..................... | 260/93.1 |
| 3,520,856 | 7/1970 | Dall'Asta ........................ | 260/79.5 |
| 3,523,145 | 8/1970 | Manaresi et al.................... | 260/886 |
| 3,577,400 | 5/1971 | Judy............................ | 260/88.2 |
| 3,580,892 | 5/1971 | Gunther et al..................... | 260/93.1 |
| 3,684,781 | 8/1972 | Nutzel et al. ..................... | 260/80.7 |
| 3,707,520 | 12/1972 | Pampus et al.............. | 260/33.6 PQ |

Primary Examiner—Stanford M. Levin
Attorney, Agent, or Firm—Millen, Raptes & White

[57] ABSTRACT

The molecular weight of polyalkenamers produced by the ring-opening polymerization of cyclic olefins can be regulated by conducting at least a portion of the polymerization reaction in the presence of a hydrocarbon monoolefin of the formula

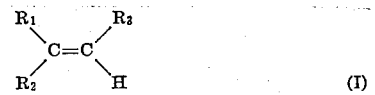

(I)

wherein $R_1$, $R_2$ and $R_3$ are hydrogen, saturated alkyl or cycloalkyl or aryl. Novel polyalkenamers thus produced include those formed of 2 to 50,000 polymer units of one of the formulae

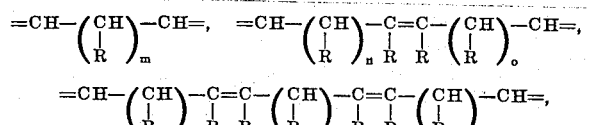

and

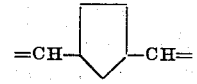

wherein R is H, alkyl, cycloalkyl or aryl; $m$ is 2,3 or 5–10; $n$ and $o$ are each 1–7 and their sum is 3–8; and $p$, $q$, and $r$ are 1–2.

15 Claims, No Drawings

3,816,382

POLYALKENAMERS AND PROCESS FOR THE PREPARATION THEREOF

BACKGROUND OF THE INVENTION

This invention relates to a process for the preparation of polyalkenamers by the ring-opening polymerization of cyclic olefins and to novel polyalkenamers thus-prepared.

It is known that cyclic olefins containing at least one unsubstituted ring double bond can be polymerized under ring-opening conditions. The catalysts employed for this ring-opening polymerization are supported catalysts which contain a metal of Subgroups 5 through 7 of the periodic table, or the compounds thereof. See German Published Application DAS 1,072,811. Preferred catalysts are the reaction products of compounds of the above-mentioned metals with organometallic compounds or hydrides of metals of Main Groups 1 through 3 or Subgroup 2 of the periodic table, as well as optionally compounds which contain one or more hydroxy and/or sulfhydryl groups. See French Patents 1,394,380 and 1,467,720; the published disclosures of Dutch Patent Applications 65-10,331; 66-05,105; 66-14,413; 67-04,424; 68-06,208; and 68-06,211. The catalysts described therein contain compounds of molybdenum or tungsten and, as organometallic compounds, usually organoaluminum compounds. According to the published texts of Dutch Patent Applications 67-14,559 and 68-06,209, vanadium, niobium, tantalum, rhenium, technetium, or manganese can also be components of such catalyst systems.

With the aid of these catalysts, a great variety of polymers can be prepared with structures which are strictly regular along the polymer chains, the structure of the polymer units being exclusively dependent on the cycloolefin employed as the monomer. Thus, it is possible, for example, to produce linear polymers, by the polymerization of monocyclic olefins; polymers having recurring polymer units containing a single ring, by the polymerization of bicyclic olefins; and, in general, polymers having recurring polymer units which contain one ring less than the starting monomer, by the polymerization of polycyclic olefins.

polyalkenamers produced by the polymerization of monocyclic olefins are of particular interest for the additional reason that, depending on the cycloolefin employed, it is possible to prepare polymers having differing double bond content. Thus, polybutenamers which are free of vinyl groups, i.e., pure 1,4-polybutadienes, are obtained from cyclobutene, 1,5-cyclooctadiene, and 1,5,9-cyclododecatriene. Polypentenamers are obtained from cyclopentene which have three —$CH_2$— groups disposed between the double bonds. Polyoctenamers are produced from cyclooctene which coorespond to a completely regular semi-hydrogenated 1,4-polybutadiene. Polydecenamers are prepared from cyclododecene corresponding to a two-thirds hydrogenated 1,4-polybutadiene in which remaining double bonds are arranged in the molecule at regular intervals. Accordingly, it is possible to produce polymers, the structures of which represent variations from pure 1,4-polybutadienes, free of vinyl groups, to strictly linear polyethylenes or polymethylenes.

It is likewise known that the average molecular weight or the degree of polymerization of a polymer affects properties of the polymer and thus its usefulness in any particular field of application, as well as its characteristics during the production and processing. Thus, polymer solutions of equal weight concentration of polymer are more viscous, the higher the molecular weight of the polymer in solution. Thus, difficulties are encountered with solutions of very high-molecular polymers, e.g., during the polymerization, for example, in the mixing or obtaining satisfactory heat exchange, and increased energy requirements for the agitating step result. Also, the further processing of very high-molecular polymers is difficult. For this reason, they are often degradated mechanically, chemically, or thermally prior to the final shaping procedure, e.g., injection-molding, extrusion, or calendering.

The polyalkenamers obtained during the ring-opening polymerization of cycloolefins are normally very high-molecular. Because of the above-described difficulties with polymers of very high molecular weight, attempts have been made in the prior art to develop processes for regulating the molecular weight of the polymers producible by a great variety of polymerization methods. In the polymerization of α-olefins with organometallic mixed catalysts, the so-called hydrogen regulation, i.e., polymerization in the presence of a certain partial hydrogen pressure, proved useful. Other possibilities for controlling the molecular weight of α-olefin polymers were varying the catalyst components, elevating the temperature or adding alkylzinc or alkylcadmium compounds during the polymerization.

Although organometallic mixed catalysts or related catalyst systems are also employed in the ring-opening polymerization of cycloolefins, the methods for molecular weight regulation employed in the polymerization of the α-olefins either are unsuccessful or exhibit definite disadvantages which make the use of such methods difficult, if not impossible, Thus, hydrogen, for example, up to an excess pressure of 4 atmospheres exerts practically no influence at all on the molecular weight of the polyalkenamers prepared by the ring-opening polymerization of cycloolefins. Even if hydrogen were effective at pressures higher than those mentioned above, the hydrogen regulating method would require increased investment costs, since the plant would have to be designed for pressures which do not occur in the unregulated ring-opening polymerization of the cycloolefins which, under normal pressure, are present in the liquid phase or in solution at the polymerization temperature. Although the molecular weight of the polyalkenamers can be reduced by employing a higher polymerization temperature, the yield and the steric uniformity of the polymers are impaired in so doing. Moreover, due to the temperature sensitivity of the mixed catalysts customarily employed for the ring-opening polymerization of cycloolefins, such catalysts become inactive above 40°-50° C. in a short period of time. Thus, very narrow limits are set for a molecular weight control by elevation of polymerization temperature.

Alterations of a catalyst system otherwise found to be optimal in order to alter molecular weight also is not recommended, since this likewise severely impairs the yield. See, for example, the published disclosure of Dutch Patent Application 66-05,105, p. 16.

The last of the above-mentioned methods for controlling the molecular weight during the polymerization of α-olefins with organometallic mixed catalysts, i.e., using an alkylzinc or alkylcadmium compound as the controlling agent, is of little practical use, even if it were effective in the ring-opening polymerization of cycloolefins, because such zinc and cadmium compounds are very toxic and can be prepared only with difficulty and thus are expensive.

The only process heretofore known wherein polymers are obtained which exhibit improved processability is described in British Patent 1,098,340. In this process, cyclic monoolefins are copolymerized under ring-opening in the presence of a conjugated diolefin, such as, for example, butadiene, isoprene, or 1,3-pentadiene. The thus-produced copolymers contain polymer units derived from both the cycloolefin and the conjugated diolefin, in varying molar ratios.

As shown in Comparative Experiments N through T in Table 3, conjugated dienes, although they influence the molecular weight of the polyalkenamers produced in polymerizations conducted in their presence, also are more or less strong catalyst poisons. Thus, for example, the presence of only 1 mol percent of 1,3-butadiene, 5 mol percent of isoprene, 5 mol percent of 2,3-dimethyl-1,3-butadiene, or 10 mol percent of 2,4-hexadiene, results in the complete inhibition of the polymerization catalyst and no polymer is obtained. Cyclic conjugated diolefins also cause a pronounced lowering of the yield of polymer. Moreover, it is not possible using such dienes as polymerization regulators to produce polymers which are waxy or oil-like products having very low molecular weights, e.g., about 500–5000.

OBJECTS OF THE INVENTION

Therefore, it is an object of the present invention to provide a new process for controlling the molecular weight of polyalkenamers in the ring-opening polymerization of cyclic olefins. It is another object to provide such a process which is simple and free from some or all of the disadvantages of the known methods for controlling molecular weight. It is a further object to provide novel polyalkenamers. Other objects will be apparent to those skilled in the art to which this invention pertains.

SUMMARY OF THE INVENTION

According to this invention, the molecular weight and structure of the polyalkenamers produced by the ring-opening polymerization of cyclic olefins is regulated by conducting the polymerization in the presence of a monoolefin as defined herein, the polymers thus produced including novel linear uniform polymers formed of 2–50,000 polymer units of one of the formulae

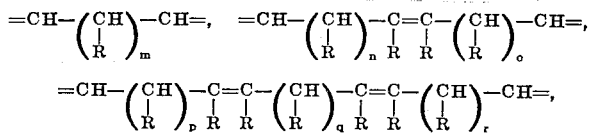

and

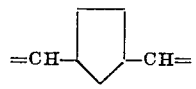

wherein R in each instance is H, alkyl, cycloalkyl or aryl; $m$ is 2,3 or 5–10; $n$ and $o$ are each 1–7 and their sum is 3–8; and $p,q$ and $r$ are 1–2.

DETAILED DISCUSSION

The cyclic olefin and cycloolefin employed in the process of this invention are unsaturated hydrocarbons containing one or more rings, at least one of which contains at least one unsubstituted non-conjugated double bond.

The cycloolefins polymerized according to the process of this invention preferably contain 4 to 12 ring carbon atoms and a total of 4 to 20, preferably 4 to 15 carbon atoms; from 1 to 3, preferably 1 to 2 rings, which can be fused or separate cycloaliphatic rings; whose ring carbon atoms are unsubstituted or one or more of which are substituted with lower-alkyl, e.g., of 1 to 4 carbon atoms, cycloalkyl, e.g., of 5 to 7 carbon atoms, or aryl, alkaryl or aralkyl, e.g., of 6 to 10 carbon atoms.

Preferred classes of starting cycloolefins are the following:

a. those containing 1 to 2 non-conjugated double bonds, preferably one;
b. those containing 1 to 2 rings, preferably one;
c. those of (a) and (b) containing two fused rings;
d. those of (a), (b), and (c) containing 0–2 lower-alkyl groups as the sole substitutents on the ring carbon atoms, preferably 0;
e. those of (d) containing 1–2 methyl groups as the sole substituents on the ring carbon atoms;
f. those of (a), (b), (c), (d), and (e) wherein the unsaturated carbon atoms each bear a hydrogen atom; and
g. those of (a), (b), (c), (d), (e) and (f) wherein the ring of the cycloolefin containing the unsaturation contains 5 or 7 to 12 ring carbon atoms.

Examples of cycloolefins which can be polymerized according to the process of this invention are cyclobutene, cyclopentene, cycloheptene, cyclooctene, cyclononene, cyclodecene, cycloundecene, cyclododecene, cis, cis-1,5-cyclooctadiene, 1-methyl-1,5-cyclooctadiene, 3,7-dimethyl-1,5-cyclooctadiene, 1,5,9-cyclododecatriene, 4,5-dimethyl-1,4,7-cyclodecatriene, cis,trans-1,5-cyclodecadiene, norbornene, dicyclopentadiene, dihydrodicyclopentadiene, and 4-phenylcyclooctene. As would be obvious, cycloolefins which cannot be polymerized with ring-opening, e.g., cyclohexene and the derivatives thereof, are not employed as starting monomers in the polymerization process of this invention.

Olefins which can be employed as polymerization regulators include those of the formula

wherein $R_1$, $R_2$ and $R_3$ are hydrogen, straight-chain, branched, or cycloaliphatic saturated alkyl groups containing 1 to 20 carbon atoms or aryl group containing 6–14 carbon atoms and the corresponding aryl substituted by 1 to 5 straight-chain, branched, or cycloaliphatic saturated alkyl groups containing 1 to 10 carbon atoms.

Examples of straight-chain and branched alkyl groups are methyl, ethyl, propyl, isopropyl, butyl, isobutyl, amyl, hexyl, heptyl, octyl and decyl. Examples of cycloalkyl are cyclopropyl, cyclobutyl, cyclopentyl, cyclohexyl, 1,4-methanocyclohexyl and p-methylcyclohexyl. Examples of aryl and substituted aryl are phenyl, tolyl, p-ethyl-phenyl, xylyl, p- cyclohexyl-phenyl, 4-indanyl, naphthyl and tetrahydronaphthyl.

Preferred classes of linear olefinic polymerization regulators are those defined by Formula I wherein:
a. $R_3$ is H;
b. $R_2$ is H, $CH_3$ or $C_2H_5$, especially those wherein $R_3$ is H;
c. $R_3$ is phenyl, e.g., those wherein $R_2$ is H or phenyl; and
d. those of (a) and/or (b) above wherein $R_1$ is straight or branched chain alkyl of 1–6 carbon atoms.

Examples of olefins of Formula 1 which can be employed as polymerization regulators are 1-phenylbutene-2, vinylcyclopentane, 3-methyl-2-pentene, 2-ethyl-1-hexene, 2-hexyl-1-decene, 2,3-diphenylpropene-1,2,4,4-trimethyl-2-pentene, 4,13-diethyl-7-eicosene, α-allylnaphthalene, or 2,3-dimethyl-1-butene, preferably ethylene, propene, butene-1,cis-butene-2, trans-butene-2, isobutene, 1-pentene, 2-pentene, 3-methyl-1-butene, 1-hexene, cis- and trans-2-hexene, cis- and trans-3-hexene, 3-methyl-1-penetene, 4-methyl-1-pentene, cis-and trans-4-methyl-2-pentene, 1-heptene, cis- and trans-2-heptene, cis- and trans-3-heptene, 3-methyl-1-hexene, 3-methyl-2-hexene, 3,3-dimethyl-1-butene, 4-methyl-1-hexene, 4-methyl-2-hexene, 3-ethyl-1-pentene, 1-octene, cis- and trans-2-octene, cis- and trans-3-octene, cis- and trans-4-octene, and higher aliphatic olefins without branching on the terminal- or central-positioned double bond, cis- or transtilbene, styrene and allylbenzene, aliphatic α-olefins which are not substituted on the double bond.

The olefin regulators can be employed both in the form of pure compounds and also as mixtures. Such mixtures, for example of isomers and/or homologs, are obtained in an extremely inexpensive manner in many petrochemical processes, for example as olefinic gases and/or gasoline fractions in cracking processes, as olefin-paraffin mixtures during the dehydrogenation or during the chlorination with subsequent dehydrochlorination of paraffinic kerosene fractions, which processes are conducted for the production of intermediates for the manufacture of raw materials for detergents, and others.

The ring-opening polymerization of cyclic olefins can be conducted by conventional procedures employing known catalysts. Thus, suitable catalysts are supported catalysts containing the metal of Subgroups 5 through 7 of the periodic table, for example, in the form of the carbonyl, sulfide, or superficially reduced oxide on a support such as, for example, aluminum oxide, aluminum silicate, or silica gel. Also suitable are mixed catalysts, e.g., containing a compound of a metal of Groups 5 through 7 of the periodic table and an organometallic compound or hydride of a metal of Main Groups 1 through 3 or Subgroup 2 of the periodic table and optionally, also a compound containing one or more hydroxy and/or sulfhydryl groups. Preferably, mixed catalysts are employed which contain a molybdenum compound or, especially, a tungsten compound. Preferred organometallic compounds are organolithium, organomagnesium and organoaluminum compounds, methylaluminum dichloride, ethylaluminum dichloride, methylaluminum sesquichloride and ethylaluminum sesquichloride. Suitable compounds which contain one or more OH- and/or SH-groups which can be concomitantly employed, if desired, as a catalyst component are, for example, water, hydrogen sulfide, hydroperoxide, alkylhydroperoxides, mercaptans, hydrodisulfides, alcohols, polyols, polymercaptans and hydroxymercaptans. Saturated and unsaturated alcohols and phenols, e.g., n-propanol, n-butanol, sec.-butanol, isobutanol, allyl alcohol, crotyl alcohol, phenol, o-, m-, and p-cresol, α- and β-naphthol, eugenol, benzyl alcohol and especially methanol, ethanol, isopropanol and tert.-butanol, are preferred.

The polymerization process of this invention is preferably conducted in solution. For this purpose, inert solvents inert under the reaction conditions are employed, e.g., benzene, cyclohexane, methylcyclohexane, isopropylcyclohexane, "Decalin," hydrogenated kerosene, paraffin oil, methylene chloride, trichloroethylene and preferably hexane, heptane, octane, and perchloroethylene. The amount of solvent employed can vary widely, e.g., 5 to 2,000 percent by weight, preferably 50 to 1,000 percent by weight, based on the monomer employed. Low-molecular oily polymers can also advantageously be prepared without a solvent by mass polymerization, so long as the viscosity of the thus-reacted mixture remains reasonably low.

The polymerization can be conducted continuously or discontinuously. The reaction temperature can vary widely, e.g., between $-70°$ and $+50°$ C. However, temperatures of between $-30°$ and $+30°$ C. are preferred.

The amount of olefin of general Formula I which is added in the process and, as a consequence, the molecular weight of the polymers produced therefrom can be varied widely without any disadvantageous effects on yield and stereospecificity of polymerization. When using, for example, cyclobutene or cyclopentene as the monomer, it is thus possible to produce rubber-like products of a high Mooney viscosity, which can be extended with large amounts of oil, as well as other readily processable rubber types.

It is also possible to produce highly tacky products of low viscosity and syrupy to oily fluids which can be utilized, for example, as drying oils directly or, after an additional reaction, as binders for varnishes or coating agents.

The amount of linear olefin polymerization regulator (control agent) of Formula I needed to obtain a product of a particular consistency depends, inter alia, on the type of the monomer employed, the kind of regulator employed, the catalyst employed, and the selected polymerization reaction conditions. The exact amount of linear olefin control agent required can easily be determined by a small number of preliminary experiments.

In general, the use of 0.01 to 5 mol-percent, preferably 0.05 to 2 mol-percent, of control agent, based on the monomer employed, results in the production of solid polyalkenamers having molecular weights in the range of commercial elastomers or thermoplastics. The addition of between 7 and 50 mol-percent of the control agent preferably between 10 and 20 mol-percent, based on the monomer employed, generally is required to produce low-viscosity to oily fluid products.

A surprising characteristic of the process of this invention is that the olefin control agent for obtaining the desired effect need not be present right from the beginning of the polymerization but can be added at any time during the polymerization so long as the catalyst is still active, i.e., the olefin control agent must be added prior to the inactivation of the catalyst. This fact makes it possible to employ olefins as regulators which, if they were exposed to the catalyst at the beginning of the polymerization in a mixture with cycloolefins, would result in the production of homopolymers which are insoluble under the reaction conditions and thus lead to inactivation of the catalyst by its inclusion within the insoluble polymer. Such an olefin is, for example, ethylene, which is likewise polymerized to insoluble polyethylene by the catalysts employed for the ring-opening polymerization of cyclic olefins. If ethylene is added to the charge after the initiation of the cycloolefin polymerization, it merely regulates the polymerization of the cycloolefin rather than being polymerized to insoluble polyethylene. It is evident from the above that if olefins which form insoluble homopolymers are employed as control agents, they must be added to the charge after the onset of the cycloolefin polymerization. The addition of such olefins after a period of at least 5 minutes, preferably at least 10 minutes, after the start of the cycloolefin polymerization has proved to be especially suitable. The tendency of an olefin to form polymers insoluble under the polymerization conditions can readily be determined by preliminary experiments.

It is also possible to add the regulator after the termination of the ring-opening polymerization, if the addition is prior to inactivating the catalyst. Surprisingly, even under these conditions, there results a regulation of the molecular weight by the presence of the olefin control agent.

After the termination of the polymerization reaction, the polyalkenamers can be isolated and purified in a conventional manner. If the polyalkenamers are obtained in solution or in the liquid phase, the residues of the catalyst can be removed with an alcohol or other compound having an acidic hydrogen, by washing out the polymer-containing phase with an aqueous or aqueous-alcoholic solution of agents having a dissolving effect on the catalyst residues, which latter are first present as an alcoholate or a salt of the other compound having an acidic hydrogen atom used to remove the catalyst. Such substances with a dissolving effect on the catalyst are, for example, acids, bases, or complex-forming agents, such as acetylacetone, citric or tartaric acid, ethylenediaminetetraacetic acid, nitrilotriacetic acid, etc.

After the catalyst has been removed, the polymers are separated by precipitation, e.g., by pouring into a precipitant such as, for example, methanol, isopropanol, or acetone, or distilling off the solvent, e.g., by blowing in steam, or by introducing the polymer solution through nozzles into hot water. When the polymer can be precipitated from the solution of the monomer in the form of flakes or a powder, the polymer can first be separated, e.g., by filtration, centrifuging, or decanting from the liquid and thereafter treated to remove the catalyst residues.

In order to protect the polyalkenamers against oxidation, gelling, and other aging phenomena, it is possible to add stabilizers thereto, e.g., aromatic amines or the sterically hindered phenols, at various stages of processing. Also, an optional further purification step can be conducted by reprecipitating the polymer if this should be necessary, to obtain a product of the desired purity. After these operations, the polymer can then be dried in a conventional manner.

In constrast to the previously known polyalkenamers which, although called linear polymers, in reality, are macrocyclic compounds, the polyalkenamers prepared in accordance with the process of this invention are truly linear polymers of a strictly regular structure with exactly defined terminal groups. Such polymers have not heretofore been produced.

By the ring-opening homopolymerization of monocyclic monoolefins of the formula

(II)

according to the process of this invention, there are obtained linear unsaturated polymers of the formula

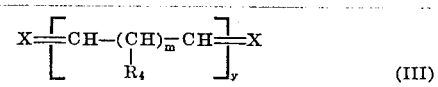
(III)

wherein X is a group of one of the formulae

(IV)

and

(V), in which $R_1$, $R_2$ and $R_3$ each are hydrogen or a straight-chain, branched, or cycloaliphatic saturated alkyl group of 1 to 20 carbon atoms, an aryl group of 6 to 14 carbon atoms, or the corresponding aryl group substituted by 1 to 5 straight-chain, branched, or cycloaliphatic saturated alkyl groups of 1 to 10 carbon atoms; $R_4$ is hydrogen or a straight-chain, branched, or cycloaliphatic saturated alkyl residue of 1 to 6 carbon atoms, or an aryl group of 6 to 10 carbon atoms; $m$ is the integer 2, 3, or an integer from 5 to 10, inclusive; and $y$ is an integer from 2 to about 50,000, preferably 5 to about 20,000.

The

groups can be alike or different, i.e., $R_4$ can represent a hydrogen atom in every instance in the molecular or 1 to $m$ of the $R_4$ groups can be an alkyl or an aryl group. Thus, by the ring-opening homopolymerization of unsubstituted monocyclic monoolefins, i.e., compounds of Formula II wherein $R_4$ is hydrogen, there are obtained polymers of the formula:

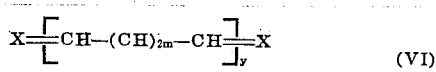
(VI)

wherein X, $y$ and $m$ have the values given above.

By the ring-opening homopolymerization of monocyclic diolefins of the formula

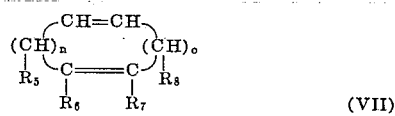
(VII)

there are obtained polymers of the formula

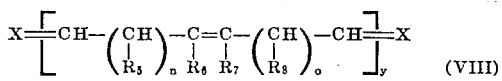

(VIII)

In Formulae VII and VIII, X and y have the values given above and $R_5$, $R_6$, $R_7$ and $R_8$, which can be alike or different, each have the same values as $R_4$. All n of the $R_5$ groups and/or all o of the $R_8$ groups can be hydrogen or from 1 to n of the $R_5$ groups and/or 1 to o of the $R_8$ groups can, respectively, be an alkyl or aryl group. The same is true of the $R_6$ and/or $R_7$ groups, which can both be hydrogen in every instance or one or both thereof can be the same or different alkyl or aryl groups. Thus, polymers of the formula

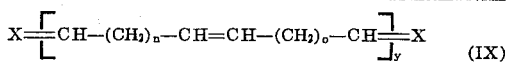

(IX)

are obtained by the ring-opening homopolymerization of unsubstituted monocyclic diolefins of Formula VII wherein X, y, n and o have the values given above and $R_5$, $R_6$, $R_7$ and $R_8$ represent hydrogen.

Polyalkenamers of the formula

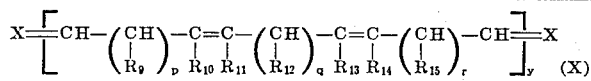

(X)

are produced by the ring-opening polymerization of monocyclic triolefins of the formula

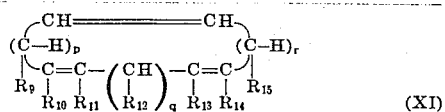

(XI)

wherein X and y have the values given above and $R_9$, $R_{10}$, $R_{11}$, $R_{12}$, $R_{13}$, $R_{14}$, and $R_{15}$ in the Formulae X and XI each have the same values as $R_4$. The various $R_9$, $R_{12}$ and $R_{15}$ groups can be identical or different groups, i.e., all p of the $R_9$ groups, all q of the $R_{12}$ groups and/or all r of the $R_{15}$ groups can be hydrogen, or from 1 to p of the $R_9$ groups, 1 to q of the $R_{12}$ groups and/or 1 to r of the $R_{15}$ groups can, respectively, be an alkyl or aryl group. The same is true of the $R_{10}$, $R_{11}$, $R_{13}$, and $R_{14}$ groups, which likewise can all represent hydrogen, or individually or severally can be identical or different alkyl or aryl groups.

By the ring-opening homopolymerization of norbornene there are obtained polymers of the formula

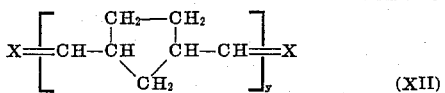

(XII)

In formulae VII, VIII, IX, X and XII, n and o each are integers from 1 to 7, the sum of which is an integer from 3 to 8; and p, q, and r each are the integers 1 or 2.

Polymers containing two or more of the above-disclosed polymer units in statistical distribution or in larger block sequences are produced by the ring-opening copolymerization of two or more of the above-mentioned cycloolefins in the presence of the claimed regulators.

The solid polymers or oligomers of the general Formulae III, VI, VIII, IX, X, and XII exhibit RSV-values (reduced specific viscosity values) of 0.01 to 10.00 dl./g. The low-molecular fluid polymers have average molecular weights in the range of about 500 to 25,000, average molecular weights meaning the arithmetical means of the molecular weights.

In former publications Natta and Dall'Asta stated (Angew. Chem. 76, 765 (1964) and J. Pol. Sci. 6, 2405 (1968)) that polyalkenamers prepared by ring-opening polymerization of cycloolefins have a strictly linear structure. Later on Calderon alleged that those polyalkenamers are in reality macrocyclic compounds (J. Am. Chem. Soc. 90, 4133 (1968)). This proposition was provided by isolation and identification of macrocyclic oligomers with polymerization rates up to 11 (Adv. Chem. Ser. 91, 399 (1969)).

The novel polyalkenamers can unexpectedly and essentially worked up more easily, as they have a lower reduced melt viscosity. Therefore they may worked up by lower temperature, e.g., by calendering, rolling or injection moulding, whereby the energy-costs are much smaller.

The examples set forth below serve to further explain the invention. Unless stated otherwise, all RSV-values were determined in benzene at 25° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 1 TO 12 AND COMPARATIVE EXPERIMENTS A TO E

Into a three-tube 1-liter glass flask with agitating unit and reflux condenser with a dropping funnel attached thereto were introduced, respectively, 100 ml. (77.8 g.) of cyclopentene and 150 ml. of hexane and were brought under an atmosphere of extremely pure nitrogen, to the reaction temperature by cooling or heating, and are mixed with the components of the polymerization catalyst. After the predetermined reaction period, the catalyst was destroyed by the addition of 50 ml. of methanol containing 3 g. of potassium hydroxide and 2 g. of 2,6-di-tert.-butyl-p-cresol ("IONOL"). After the addition of 100 ml. of distilled water and 50 ml. of methanol, so that a second phase containing 50 percent methanol was formed, the reaction mixture was then further agitated for three hours, to wash out the catalyst residues. The aqueous-methanolic phase was then removed by pipetting and the reaction mixture was washed twice with 50 percent aqueous methanol. The polymer was then precipitated by pouring the organic phase into 3 liters of methanol. The precipitated product was dissolved once again in 250 ml. of hexane, for purposes of an additional purification, and re-precipitated with methanol to which was again added 2 g. of stabilizer ("IONOL"). After decocting the polymer for 2 hours with 500 ml. of pure methanol, it was dried for 40 hours at 50°C. in a vacuum drying chamber. The thus-purified polymer was employed for determining the yield and the analytical data. In each case, such a blank test (designated in the table by capital letters) was conducted to exclude sources of errors due to changing impurities in the solvent, the monomer, or the catalyst components, in parallel to the polymerizations employing one of three regulator olefins (numbered examples). The regulators to be tested were admixed with the monomers in the examples. In Table 1, the amount of regulator is set forth in molar percent, based on the monomer employed.

chloride, and 10 times the amount of ethylaluminum dichloride is employed in the absence of a polymerization regulator, 3.1 g. of a polymer is obtained which ex- TABLE 1.—POLYMERIZATION OF CYCLOPENTENE
[Catalyst system: Tungsten hexachloride/ethylaluminum dichloride/ethanol]

| Experiment number | Polym. temp., °C. | Catalyst, mmol | | | Polym. period, hrs. | Regulator | | Polymer | | | |
|---|---|---|---|---|---|---|---|---|---|---|---|
| | | WCl$_6$ | EtAlCl$_2$ | EtOH | | Mol percent | Name | Yield, g. | RSV, dl./g. | trans-Content, percent | Gel, percent |
| A | 0 | 0.5 | 4 | 0.5 | 2.5 | | | 16.7 | 5.02 | 83 | 2 |
| 1 | 0 | 0.5 | 4 | 0.5 | 2.5 | 5 | Isobutene | 14.3 | 1.35 | 84 | 2 |
| 2 | 0 | 0.5 | 4 | 0.5 | 2.5 | 5 | cis-Butene-2 | 19.2 | 0.23 | 83 | 4 |
| B | 0 | 0.5 | 4 | 0.5 | 2.5 | | | 9.3 | 5.55 | 63 | 2 |
| 3 | 0 | 0.5 | 4 | 0.5 | 2.5 | 1 | trans-Stilbene | 15.7 | 4.05 | 91 | 2 |
| 4 | 0 | 0.5 | 4 | 0.5 | 2.5 | 1 | cis-Stilbene | 25.1 | 3.13 | 93 | 2 |
| 5 | 0 | 0.5 | 4 | 0.5 | 2.5 | 1 | 3-methyl-1-pentene | 25.7 | 0.84 | 94 | 2 |
| C | 0 | 0.5 | 4 | 0.5 | 2.0 | | | 29.8 | 5.73 | 83 | 2 |
| 6 | 0 | 0.5 | 4 | 0.5 | 2.0 | 1 | Styrene | 11.5 | 2.49 | 92 | 3 |
| 7 | 0 | 0.5 | 4 | 0.5 | 2.0 | 1 | 4-methyl-1-pentene | 11.2 | 0.79 | 94 | 2 |
| D | 20 | 0.5 | 10 | 0.5 | 20 | | | 19.4 | 2.35 | 82 | 3 |
| 8 | 20 | 0.5 | 10 | 0.5 | 20 | 1 | 4-methyl-1-pentene | 12.8 | [1] 13 300 | 74 | |
| 9 | 20 | 0.5 | 10 | 0.5 | 20 | 1 | 1-octene | 11.0 | [1] 8 300 | 75 | |
| E | 0 | 0.5 | 4 | 0.5 | 2.5 | | | 14.1 | 3.69 | 77 | 2 |
| 10 | 0 | 0.5 | 4 | 0.5 | 2.5 | 1 | 3,3-dimethyl-1-butene | 18.9 | 1.08 | 72 | 2 |
| 11 | 0 | 0.5 | 4 | 0.5 | 2.5 | 1 | 2-ethyl-1-hexene | 13.1 | 2.47 | 85 | 2 |
| 12 | 0 | 0.5 | 4 | 0.5 | 2.5 | 1 | 2,3-dimethyl-1-butene | 13.3 | 2.89 | 87 | 2 |

[1] Could not be determined; instead, the molecular weight (m.w.) determined by vapor pressure osmosis is set forth.

EXAMPLE 13

PREPARATION OF A LIQUID POLYPENTENAMER

One liter (778 g.) of cyclopentene was mixed with 128 g. (10 mol percent) of a mixture of n-octene isomers (2 percent vinyl double bond content detectable in the IR spectrum). After the addition of 5 millimols of tungsten hexachloride and 5 millimols of ethanol, and 100 millimols of ethylaluminum dichloride, the mixture was agitated for 20 hours at 20° C. under an atmosphere of pure nitrogen. The work-up operation was conducted as described in Examples 1 through 12. There was obtained 192.8g. (21.3 percent of theory) of a syrupy, low-viscosity polymer which exhibited a molecular weight of 3,400 (determined by vapor pressure osmosis), an iodine number of 349.0, and a trans-double bond content of 76 percent of the double bonds detectable by IR-spectroscopy.

EXAMPLE 14 AND COMPARATIVE EXAMPLE F

CATALYST SYSTEM COMPRISING MOLYBDENUM PENTACHLORIDE

If the conditions employed in Examples 1–7 and 10–12 are followed, except the tungsten hexachloride is replaced by an equimolar amount of molybdenum pentachloride, 1.1 g. of a polymer is obtained when an olefin regulator is not present, which polymer exhibits a reduced specific viscosity of 10.28 dl./g. and has a 64 percent trans-double bond and 3 percent gel content. In contrast thereto, with the addition to the reaction mixture of 1 mol percent of the n-octene mixture described in Example 13, 1.0 g. of a polymer is obtained, whose RSV is only 3.28 dl./g. (transcontent: 69 percent with 2 percent gel).

EXAMPLE 15 and COMPARATIVE EXPERIMENT G

CATALYST SYSTEM COMPRISING TANTALUM PENTACHLORIDE

If the experimental conditions of Examples 1–7 and 10–12 are followed, except that the polymerization temperature is −30° C. and 10 times the molar amount of tantalum pentachloride in place of tungsten hexahibits a RSV of 10.03 dl./g. and an 80 percent trans-double bond and 7 percent gel content. With the addition of 1 molar percent of the n-octene mixture described in Example 13, 2.8 g. of a polymer is obtained, the RSV of which is only 6.68 dl./g. (trans-content: above 95 percent, with 5 percent gel).

EXAMPLE 16 and COMPARATIVE EXPERIMENT H

ADDITION OF REGULATOR TOWARD THE END OF THE POLYMERIZATION

In a 1-liter glass autoclave, 200 ml. of cyclopentene and 300 ml. of hexane were placed under an ethylene pressure of 4 atmospheres gauge by a single pressure addition. During the agitation, this pressure was quickly reduced to normal pressure by the dissolution of the ethylene. Thereafter, 1 millimol of tungsten hexachloride, 1 millimole of ethanol, and 20 millimols of ethylaluminum dichloride were added thereto. The entire mixture was stirred for five hours at 20° C. and worked up in a manner already described above. Only 2.9 g. of a mixture of polyethylene and an elastomeric substance was obtained as the polymer.

Repeating the experiment, with the only change being the addition of the ethylene after a reaction period of 15 minutes and thereafter agitating the mixture for 5 hours, 16.1 g. of a polymer was obtained having a RSV 1.63 dl./g., which was practically free of polyethylene. The trans-content of this polymer was 91 percent, and it contained 3 percent gel.

EXAMPLES 17 to 25 and COMPARATIVE EXPERIMENTS J to M

Examples 17 to 20 and Comparative Experiments J through M were conducted in accordance with the mode of operation set forth for Examples 1–12 and Comparative Experiments A through E. The solvent was, in all cases, technical hexane (boiling point limits: 68°–70° C.). The amount of hexane was chosen so that the solutions, prior to the polymerization, contained 20 percent by volume of cyclododecene, 15 percent by volume of cyclooctene, 11 percent by volume of norbornene, or 25 percent by volume of 1,5-cyclooctadiene, respectively.

The polymers were worked up in a manner described above and then analyzed.

TABLE 2.—POLYMERIZATION OF VARIOUS CYCLIC MONOMERS

[Catalyst system: Tungsten hexachloride/ethanol/ethylaluminum dichloride. Regulator: Mixture of isomeric n-octenes with 2% 1-octene]

| Experiment number | Monomer Type | Amount, g. | Catalyst, mmol | | | Polymerization | | Regulator, mol percent | Polymer | | | |
|---|---|---|---|---|---|---|---|---|---|---|---|---|
| | | | WCl₆ | EtOH | EtAlCl₂ | Temp., °C. | Period, hrs. | | Yield, g. | RSV, dl./g. | Trans, percent | Gel, percent |
| J | Cyclododecene | 87.5 | 0.5 | 0.5 | 4 | 0 | 2.5 | -------- | 13.9 | ¹ 2.15 | 82 | M.P. 145-150° C. |
| 17 | do | 87.5 | 0.5 | 0.5 | 4 | 0 | 2.5 | 0.5 | 11.4 | ¹ 1.33 | 70 | M.P. 74-76° C. |
| 18 | do | 87.5 | 0.5 | 0.5 | 4 | 0 | 2.5 | 1.0 | 11.3 | ¹ 0.60 | 80 | M.P. 65-69° C. |
| 19 | do | 87.5 | 0.5 | 0.5 | 4 | 0 | 2.5 | 10.0 | 12.1 | ¹ 0.16 | 65 | M.P. 50-53° C. |
| K | Cyclooctene | 30 | 0.2 | 0.2 | 0.4 | 0 | 4 | -------- | 24.4 | 2.36 | 81 | 2 |
| 20 | do | 30 | 0.2 | 0.2 | 0.4 | 0 | 4 | 1 | 21.8 | ² 7,400 | 68 | -------- |
| L | Norbornene | 50 | 0.5 | 0.5 | 2 | 0 | 0.5 | -------- | 49.2 | | | Insoluble |
| 21 | do | 50 | 0.5 | 0.5 | 2 | 0 | 0.5 | 1 | 49.6 | | | Insoluble |
| 22 | do | 50 | 0.5 | 0.5 | 2 | 0 | 0.5 | 5 | 46.9 | 2.05 | -------- | |
| M | 1,5-cyclooctadiene | 200 | 1.0 | 1.0 | 4 | 0 | 2 | -------- | 126.5 | 3.67 | 71 | 45 |
| 23 | do | 200 | 1.0 | 1.0 | 4 | 0 | 2 | 1 | 167.9 | 2.90 | 85 | 34 |
| 24 | do | 200 | 1.0 | 1.0 | 4 | 0 | 2 | 2 | 162.9 | 1.63 | 79 | 15 |
| 25 | do | 200 | 1.0 | 1.0 | 4 | 0 | 2 | 5 | 140.5 | 0.12 | 91 | -------- |

¹ RSV for Examples 17 through 19 and Comparative Experiment J were measured in "Decalin" at 135° C., and for all remaining experiments, in benzene at 25° C.
² M.w.

SERIES OF COMPARATIVE EXPERIMENTS N THROUGH T

The series of Comparative Experiments N through T were conducted in accordance with the mode of operation set forth for Examples 1–12 and Comparative Experiments A through E. For each experiment, 100 ml. (87.5 g.) of cyclododecene was employed as the monomer and 150 ml. of technical hexane (boiling point limits: 68°–70° C.) was used as the solvent. The various conjugated dienes were employed in differing quantities as set forth in Table 3. As the catalyst for each experiment, 0.5 millimol of tungsten hexachloride, 0.5 millimol of ethanol, and 3 millimols of ethylaluminum dichloride were employed. The polymerization period in all the experiments was 2.5 hours at 20° C. The polymers were worked up in the manner described above and then analyzed.

TABLE 3

| Experimental Series No. | Conjugated diolefin | | Polymer | | |
|---|---|---|---|---|---|
| | Name | Mol percent | Yield G. | Yield Percent | RSV, dl./g. | Trans, percent |
| N | 1,3-butadiene | ---- | 21.9 | 25.2 | 1.96 | 40 |
| | | 1 | 0.8 | 0.9 | 0.30 | 40 |
| | | 5 | 0.2 | 0.2 | 0.06 | (²) |
| | | 10 | 0.3 | 0.3 | 0.07 | (²) |
| O | Isoprene | ---- | 46.1 | 53.0 | 2.25 | 46 |
| | | 1 | 47.1 | 54.2 | 1.07 | 44 |
| | | 2 | 10.1 | 11.6 | 0.94 | 52 |
| | | 5 | No polymer | | | |
| P | 2,3-dimethylbutadiene | ---- | 21.6 | 24.8 | 2.15 | 45 |
| | | 1 | 12.0 | 13.8 | 1.25 | 46 |
| | | 5 | No polymer | | | |
| Q | 2,4-hexadiene | ---- | 37.8 | 43.5 | 2.22 | 49 |
| | | 1 | 24.9 | 28.6 | 0.47 | 40 |
| | | 5 | 7.2 | 8.3 | 0.15 | 42 |
| | | 10 | No polymer | | | |
| R | Cyclopentadiene | ---- | 45.4 | 52.3 | 2.26 | 52 |
| | | 1 | 16.8 | 19.3 | 1.30 | 46 |
| | | 10 | 12.2 | 14.0 | 0.34 | 34 |
| S | 1,3-cyclododecadiene | ---- | 47.2 | 54.2 | 2.16 | 43 |
| | | 1 | 13.9 | 16.0 | 1.02 | 42 |
| | | 5 | 1.8 | 2.1 | (¹) | 40 |
| | | 10 | 1.5 | 1.7 | (²) | -------- |
| T | 1,3-cyclooctadiene | ---- | 26.5 | 30.5 | 1.63 | 41 |
| | | 1 | 12.2 | 14.0 | 1.61 | 36 |
| | | 5 | 8.1 | 9.3 | 1.52 | 46 |
| | | 10 | 4.0 | 4.6 | 1.10 | 43 |

¹ Polymer contains insoluble components.
² Too little substance.

NOTE.—All RSV-values were measured at 135° C. in "Decalin."

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of polyalkenamers by the catalyzed ring-opening polymerization of cyclic olefins containing 7–12 ring carbon atoms employing a ring-opening catalyst of a metal of Subgroups 5 through 7 of the periodic table, the improvement which comprises producing low-viscosity to oily fluid products by regulating the molecular weight of the polyalkenamer by adding to the polymerization mixture, prior to the inactivation of the catalyst for the cyclic olefin polymerization, between 7 and 50 molar percent, based on the cyclic olefin, of an olefin polymerization regulator of the formula

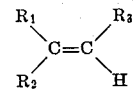

wherein $R_1$, $R_2$ and $R_3$ each are hydrogen, a straight-chain, branched, or cycloaliphatic saturated alkyl group containing 1 to 20 carbon atoms, an aryl group containing 6 to 14 ring carbon atoms or a corresponding aryl group substituted by 1 to 5 straight-chain, branched, or cycloaliphatic saturated alkyl groups containing 1 to 10 carbon atoms.

2. A process according to claim 1 wherein at least one of $R_1$, $R_2$ and $R_3$ is hydrogen.

3. A process according to claim 2 wherein at least two of $R_1$, $R_2$ and $R_3$ are hydrogen.

4. A process according to claim 1 wherein at least one of $R_1$, $R_2$ and $R_3$ is an aryl group.

5. A process according to claim 4 wherein each such aryl group is a phenyl group.

6. A process according to claim 5 wherein each such phenyl group is unsubstituted.

7. A process according to claim 1 wherein at least one of $R_1$, $R_2$ and $R_3$ is an alkyl group and each such alkyl group contains 1 to 8 carbon atoms.

8. A process according to claim 1 wherein the olefin polymerization regulator is added after initiation of the polymerization.

9. A process according to claim 1 wherein the olefin polymerization regulator is employed in an amount of 10 to 20 mol-percent based on the cyclic monomer used.

10. A process according to claim 1 wherein the cyclic monomer is cyclooctene.

11. A process according to claim 1 wherein the cyclic monomer is cyclooctadiene.

12. A process according to claim 1 wherein the cyclic monomer is cyclododecene.

13. A process according to claim 1 wherein the cyclic monomer is norbornene.

14. In a process for the production of polyalkenamers by the catalyzed ring-opening polymerization of cyclic olefins containing 4–12 ring carbon atoms employing a ring-opening catalyst of a metal of Subgroups 5 through 7 of the periodic table, the improvement which comprises producing low-viscosity to oily fluid products by regulating the molecular weight of the polyalkenamer by adding to the polymerization charge, prior to to polymerization, between 7 and 50 molar percent, based on the cyclic olefin, of an olefin polymerization regulator of the formula

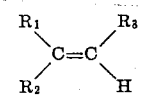

wherein $R_1$, $R_2$ and $R_3$ each are hydrogen, a straight-chain, branched, or cycloaliphatic saturated alkyl group containing 1 to 20 carbon atoms, an aryl group containing 6 to 14 ring carbon atoms or a corresponding aryl group substituted by 1 to 5 straight-chain, branched, or cycloaliphatic saturated alkyl groups containing 1 to 10 carbon atoms.

15. The process of claim 14 wherein the cyclic monomer is cyclopentene.

* * * * *